US006891951B2

(12) United States Patent
Inoha et al.

(10) Patent No.: US 6,891,951 B2
(45) Date of Patent: May 10, 2005

(54) CRYPTOSYSTEM-RELATED METHOD AND APPARATUS

(75) Inventors: Wataru Inoha, Yokosuka (JP); Takayuki Sugahara, Yokosuka (JP); Toshio Kuroiwa, Yokohama (JP); Kenjiro Ueda, Yokosuka (JP); Seiji Higurashi, Tokyo (JP)

(73) Assignee: Victor Company of Japan, Ltd., Yokohama (JP)

( * ) Notice: Subject to any disclaimer, the term of this patent is extended or adjusted under 35 U.S.C. 154(b) by 871 days.

(21) Appl. No.: 09/733,057

(22) Filed: Dec. 11, 2000

(65) Prior Publication Data

US 2001/0009579 A1 Jul. 26, 2001

(30) Foreign Application Priority Data

Jan. 21, 2000 (JP) ...................................... 2000-012734
Jan. 26, 2000 (JP) ...................................... 2000-016937

(51) Int. Cl.[7] .............................................. H04L 9/14
(52) U.S. Cl. ......................................... 380/44; 713/193
(58) Field of Search .............................. 380/44, 46, 28; 713/200, 193

(56) References Cited

U.S. PATENT DOCUMENTS

| 5,003,596 | A | | 3/1991 | Wood |
| 5,442,705 | A | * | 8/1995 | Miyano ........................ 380/29 |
| 5,825,886 | A | | 10/1998 | Adams et al. |
| 5,892,829 | A | * | 4/1999 | Aiello et al. ................. 713/180 |

FOREIGN PATENT DOCUMENTS

| DE | 19811593 | 5/1999 |
| WO | WO 9705720 | 2/1997 |

OTHER PUBLICATIONS

Authentication, Hash Functions, Digital☐☐Signature☐☐http://williamstallings.com/Extras/Security–Notes/lectures/authent.html.*
Schneier, Bruce, 1996, Applied Crytography Second Edition, pp. 274–275.*
Data Encryption Standard (DES); Federal Information Processing Standards Publication 46–2; Dec. 30, 1993; pp., 1–16.

* cited by examiner

Primary Examiner—Gregory Morse
Assistant Examiner—Andrew Nalven
(74) Attorney, Agent, or Firm—Louis Woo

(57) ABSTRACT

Bits of a first bit sequence are rearranged in a first matrix according to a predetermined arrangement rule. The first bit sequence represents information being a base of a key. Blocks are formed in the first matrix. Each of the blocks has bits, the number of which is smaller than the number of bits composing the first matrix. Logical operation is executed among bits in each of the blocks, and a bit being a result of the logical operation is generated. The logical-operation-result bits are combined into a second bit sequence. The number of bits composing the second bit sequence is smaller than the number of bits composing the first bit sequence. There is a second matrix composed of predetermined third bit sequences. The second matrix is accessed and one is read out from among the third bit sequences in response to the second bit sequence. The read-out third bit sequence is outputted as information representative of the key. The number of bits composing each of the third bit sequences is smaller than the number of bits composing the second bit sequence.

16 Claims, 7 Drawing Sheets

CRYPTOSYSTEM-RELATED METHOD AND APPARATUS

BACKGROUND OF THE INVENTION

1. Field of the Invention

This invention relates to a method of generating key information. Also, this invention relates to an apparatus for generating key information. In addition, this invention relates to a method of encrypting contents information. Furthermore, this invention relates to an apparatus for encrypting contents information. Also, this invention relates to a method of decrypting contents information. In addition, this invention relates to an apparatus for decrypting contents information. Furthermore, this invention relates to a recording medium. Also, this invention relates to a method of transmitting contents information.

2. Description of the Related Art

In a known system for protecting the copyright of digital contents information, a provider side encrypts the digital contents information in response to an encryption key. In some cases, the encryption-resultant contents information is recorded on a recording medium such as a magnetic tape, a magnetic disc, an optical disc, or a memory card. In other cases, the encryption-resultant contents information is transmitted through a communication network. A user side of the known system receives the encryption-resultant contents information from the recording medium or the communication network. The user side decrypts the encryption-resultant contents information into the original contents information in response to a decryption key equivalent to the encryption key.

A conventional DES (Data Encryption Standard) system encrypts every 64-bit block of an input data into a 64-bit encryption-resultant block in response to a 64-bit encryption key. Since 8 bits among the 64 bits are used for parities, the encryption key has 56 effective bits. The conventional DES system uses an S-Box (a Selection-Box) which outputs a 4-bit data piece in response to every 6-bit input data piece according to a one-way hash function. Thus, the S-Box implements data compression. The S-Box in the conventional DES system lacks flexibility regarding a data compression rate.

SUMMARY OF THE INVENTION

It is a first object of this invention to provide an improved method of generating key information.

It is a second object of this invention to provide an improved apparatus for generating key information.

It is a third object of this invention to provide an improved method of encrypting contents information.

It is a fourth object of this invention to provide an improved apparatus for encrypting contents information.

It is a fifth object of this invention to provide an improved method of decrypting contents information.

It is a sixth object of this invention to provide an improved apparatus for decrypting contents information.

It is a seventh object of this invention to provide an improved recording medium.

It is an eighth object of this invention to provide an improved method of transmitting contents information.

A first aspect of this invention provides a method of generating key information. The method comprises the steps of rearranging bits of a first bit sequence in a first matrix according to a predetermined arrangement rule, the first bit sequence representing information being a base of a key; forming blocks in the first matrix, wherein each of the blocks has bits, the number of which is smaller than the number of bits composing the first matrix; executing logical operation among bits in each of the blocks and generating a bit being a result of the logical operation; combining the logical-operation-result bits into a second bit sequence, wherein the number of bits composing the second bit sequence is smaller than the number of bits composing the first bit sequence; and accessing a second matrix composed of predetermined third bit sequences and reading out one from among the third bit sequences in response to the second bit sequence, and outputting the read-out third bit sequence as information representative of the key, wherein the number of bits composing each of the third bit sequences is smaller than the number of bits composing the second bit sequence.

A second aspect of this invention provides an apparatus for generating key information. The apparatus comprises means for rearranging bits of a first bit sequence in a first matrix according to a predetermined arrangement rule, the first bit sequence representing information being a base of a key; means for forming blocks in the first matrix, wherein each of the blocks has bits, the number of which is smaller than the number of bits composing the first matrix; means for executing logical operation among bits in each of the blocks and generating a bit being a result of the logical operation; means for combining the logical-operation-result bits into a second bit sequence, wherein the number of bits composing the second bit sequence is smaller than the number of bits composing the first bit sequence; and means for accessing a second matrix composed of predetermined third bit sequences and reading out one from among the third bit sequences in response to the second bit sequence, and outputting the read-out third bit sequence as information representative of the key, wherein the number of bits composing each of the third bit sequences is smaller than the number of bits composing the second bit sequence.

A third aspect of this invention provides a method of encrypting contents information. The method comprises the steps of generating a signal representative of a key from information being a base of the key, the key base information including a first bit sequence; and encrypting contents information in response to the key signal. The generating step comprises 1) rearranging bits of the first bit sequence in a first matrix according to a predetermined arrangement rule; 2) forming blocks in the first matrix, wherein each of the blocks has bits, the number of which is smaller than the number of bits composing the first matrix; 3) executing logical operation among bits in each of the blocks and generating a bit being a result of the logical operation; 4) combining the logical-operation-result bits into a second bit sequence, wherein the number of bits composing the second bit sequence is smaller than the number of bits composing the first bit sequence; and 5) accessing a second matrix composed of predetermined third bit sequences and reading out one from among the third bit sequences in response to the second bit sequence, and outputting the read-out third bit sequence as the key signal, wherein the number of bits composing each of the third bit sequences is smaller than the number of bits composing the second bit sequence.

A fourth aspect of this invention provides an apparatus for encrypting contents information. The apparatus comprises means for generating a signal representative of a key from information being a base of the key, the key base information including a first bit sequence; and means for encrypting contents information in response to the key signal. The generating means comprises 1) means for rearranging bits of the first bit sequence in a first matrix according to a predetermined arrangement rule; 2) means for forming blocks in the first matrix, wherein each of the blocks has bits, the number of which is smaller than the number of bits composing the first matrix; 3) means for executing logical operation among bits in each of the blocks and generating a bit being a result of the logical operation; 4) means for combining the logical-operation-result bits into a second bit sequence, wherein the number of bits composing the second bit sequence is smaller than the number of bits composing the first bit sequence; and 5) means for accessing a second matrix composed of predetermined third bit sequences and reading out one from among the third bit sequences in response to the second bit sequence, and outputting the read-out third bit sequence as the key signal, wherein the number of bits composing each of the third bit sequences is smaller than the number of bits composing the second bit sequence.

A fifth aspect of this invention provides a method of decrypting contents information. The method comprises the steps of generating a signal representative of a key from information being a base of the key, the key base information including a first bit sequence; and decrypting encryption-resultant contents information in response to the key signal. The generating step comprises 1) rearranging bits of the first bit sequence in a first matrix according to a predetermined arrangement rule; 2) forming blocks in the first matrix, wherein each of the blocks has bits, the number of which is smaller than the number of bits composing the first matrix; 3) executing logical operation among bits in each of the blocks and generating a bit being a result of the logical operation; 4) combining the logical-operation-result bits into a second bit sequence, wherein the number of bits composing the second bit sequence is smaller than the number of bits composing the first bit sequence; and 5) accessing a second matrix composed of predetermined third bit sequences and reading out one from among the third bit sequences in response to the second bit sequence, and outputting the read-out third bit sequence as the key signal, wherein the number of bits composing each of the third bit sequences is smaller than the number of bits composing the second bit sequence.

A sixth aspect of this invention provides an apparatus for decrypting contents information. The apparatus comprises means for generating a signal representative of a key from information being a base of the key, the key base information including a first bit sequence; and means for decrypting encryption-resultant contents information in response to the key signal. The generating means comprises 1) means for rearranging bits of the first bit sequence in a first matrix according to a predetermined arrangement rule; 2) means for forming blocks in the first matrix, wherein each of the blocks has bits, the number of which is smaller than the number of bits composing the first matrix; 3) means for executing logical operation among bits in each of the blocks and generating a bit being a result of the logical operation; 4) means for combining the logical-operation-result bits into a second bit sequence, wherein the number of bits composing the second bit sequence is smaller than the number of bits composing the first bit sequence; and 5) means for accessing a second matrix composed of predetermined third bit sequences and reading out one from among the third bit sequences in response to the second bit sequence, and outputting the read-out third bit sequence as the key signal, wherein the number of bits composing each of the third bit sequences is smaller than the number of bits composing the second bit sequence.

A seventh aspect of this invention provides a recording medium storing encryption-resultant key base information and encryption-resultant contents information generated by the method in the third aspect of this invention.

An eighth aspect of this invention provides a method of transmitting contents information. The method comprises the steps of transmitting encryption-resultant key base information through a transmission line, and transmitting encryption-resultant contents information through the transmission line, the encryption-resultant contents information being generated by the method in the third aspect of this invention.

A ninth aspect of this invention provides a method of generating key information. The method comprises the steps of dividing a first bit sequence into second bit sequences, the first bit sequence being contained in information being a base of a key, wherein the number of bits composing each of the second bit sequences is smaller than the number of bits composing the first bit sequence; sequentially accessing a first matrix composed of predetermined data pieces and sequentially reading out ones from among the predetermined data pieces in response to the second bit sequences; combining the read-out data pieces into a third bit sequence, wherein the number of bits composing the third bit sequence is smaller than the number of bits composing the first bit sequence; rearranging bits of at least part of the third bit sequence in a second matrix according to a predetermined arrangement rule; forming blocks in the second matrix, wherein each of the blocks has bits, the number of which is smaller than the number of bits composing the second matrix; executing logical operation among bits in each of the blocks and generating a bit being a result of the logical operation; and combining the logical-operation-result bits into a fourth bit sequence, and outputting the fourth bit sequence as at least part of information representative of the key, wherein the number of bits composing the fourth bit sequence is smaller than the number of bits composing the second matrix.

A tenth aspect of this invention provides an apparatus for generating key information. The apparatus comprises means for dividing a first bit sequence into second bit sequences, the first bit sequence being contained in information being a base of a key, wherein the number of bits composing each of the second bit sequences is smaller than the number of bits composing the first bit sequence; means for sequentially accessing a first matrix composed of predetermined data pieces and sequentially reading out ones from among the predetermined data pieces in response to the second bit sequences; means for combining the read-out data pieces into a third bit sequence, wherein the number of bits composing the third bit sequence is smaller than the number of bits composing the first bit sequence; means for rearranging bits of at least part of the third bit sequence in a second matrix according to a predetermined arrangement rule; means for forming blocks in the second matrix, wherein each of the blocks has bits, the number of which is smaller than the number of bits composing the second matrix; means for executing logical operation among bits in each of the blocks and generating a bit being a result of the logical operation; and means for combining the logical-operation-result bits into a fourth bit sequence, and outputting the fourth bit sequence as at least part of information representative of the key, wherein the number of bits composing the fourth bit sequence is smaller than the number of bits composing the second matrix.

An eleventh aspect of this invention provides a method of encrypting contents information. The method comprises the steps of generating a signal representative of a key from information being a base of the key, the key base information including a first bit sequence; and encrypting contents information in response to the key signal. The generating step comprises 1) dividing the first bit sequence into second bit sequences, wherein the number of bits composing each of the second bit sequences is smaller than the number of bits composing the first bit sequence; 2) sequentially accessing a first matrix composed of predetermined data pieces and sequentially reading out ones from among the predetermined data pieces in response to the second bit sequences; 3) combining the read-out data pieces into a third bit sequence, wherein the number of bits composing the third bit sequence is smaller than the number of bits composing the first bit sequence; 4) rearranging bits of at least part of the third bit sequence in a second matrix according to a predetermined arrangement rule; 5) forming blocks in the second matrix, wherein each of the blocks has bits, the number of which is smaller than the number of bits composing the second matrix; 6) executing logical operation among bits in each of the blocks and generating a bit being a result of the logical operation; and 7) combining the logical-operation-result bits into a fourth bit sequence, and outputting the fourth bit sequence as at least part of the key signal.

A twelfth aspect of this invention provides an apparatus for encrypting contents information. The apparatus comprises means for generating a signal representative of a key from information being a base of the key, the key base information including a first bit sequence; and means for encrypting contents information in response to the key signal. The generating means comprises 1) means for dividing the first bit sequence into second bit sequences, wherein the number of bits composing each of the second bit sequences is smaller than the number of bits composing the first bit sequence; 2) means for sequentially accessing a first matrix composed of predetermined data pieces and sequentially reading out ones from among the predetermined data pieces in response to the second bit sequences; 3) means for combining the read-out data pieces into a third bit sequence, wherein the number of bits composing the third bit sequence is smaller than the number of bits composing the first bit sequence; 4) means for rearranging bits of at least part of the third bit sequence in a second matrix according to a predetermined arrangement rule; 5) means for forming blocks in the second matrix, wherein each of the blocks has bits, the number of which is smaller than the number of bits composing the second matrix; 6) means for executing logical operation among bits in each of the blocks and generating a bit being a result of the logical operation; and 7) means for combining the logical-operation-result bits into a fourth bit sequence, and outputting the fourth bit sequence as at least part of the key signal.

A thirteenth aspect of this invention provides a method of decrypting contents information. The method comprises the steps of generating a signal representative of a key from information being a base of the key, the key base information including a first bit sequence; and decrypting encryption-resultant contents information in response to the key signal. The generating step comprises 1) dividing the first bit sequence into second bit sequences, wherein the number of bits composing each of the second bit sequences is smaller than the number of bits composing the first bit sequence; 2) sequentially accessing a first matrix composed of predetermined data pieces and sequentially reading out ones from among the predetermined data pieces in response to the second bit sequences; 3) combining the read-out data pieces into a third bit sequence, wherein the number of bits composing the third bit sequence is smaller than the number of bits composing the first bit sequence; 4) rearranging bits of at least part of the third bit sequence in a second matrix according to a predetermined arrangement rule; 5) forming blocks in the second matrix, wherein each of the blocks has bits, the number of which is smaller than the number of bits composing the second matrix; 6) executing logical operation among bits in each of the blocks and generating a bit being a result of the logical operation; and 7) combining the logical-operation-result bits into a fourth bit sequence, and outputting the fourth bit sequence as at least part of the key signal.

A fourteenth aspect of this invention provides an apparatus for decrypting contents information. The apparatus comprises means for generating a signal representative of a key from information being a base of the key, the key base information including a first bit sequence; and means for decrypting encryption-resultant contents information in response to the key signal. The generating means comprises 1) means for dividing the first bit sequence into second bit sequences, wherein the number of bits composing each of the second bit sequences is smaller than the number of bits composing the first bit sequence; 2) means for sequentially accessing a first matrix composed of predetermined data pieces and sequentially reading out ones from among the predetermined data pieces in response to the second bit sequences; 3) means for combining the read-out data pieces into a third bit sequence, wherein the number of bits composing the third bit sequence is smaller than the number of bits composing the first bit sequence; 4) means for rearranging bits of at least part of the third bit sequence in a second matrix according to a predetermined arrangement rule; 5) means for forming blocks in the second matrix, wherein each of the blocks has bits, the number of which is smaller than the number of bits composing the second matrix; 6) means for executing logical operation among bits in each of the blocks and generating a bit being a result of the logical operation; and 7) means for combining the logical-operation-result bits into a fourth bit sequence, and outputting the fourth bit sequence as at least part of the key signal.

A fifteenth aspect of this invention provides a recording medium storing encryption-resultant key base information and encryption-resultant contents information generated by the method in the eleventh aspect of this invention.

A sixteenth aspect of this invention provides a method of transmitting contents information. The method comprises the steps of transmitting encryption-resultant key base information through a transmission line, and transmitting encryption-resultant contents information through the transmission line, the encryption-resultant contents information being generated by the method in the eleventh aspect of this invention.

DESCRIPTION OF THE PREFERRED EMBODIMENTS

A prior-art S-Box will be explained below for a better understanding of this invention.

Figure 1:
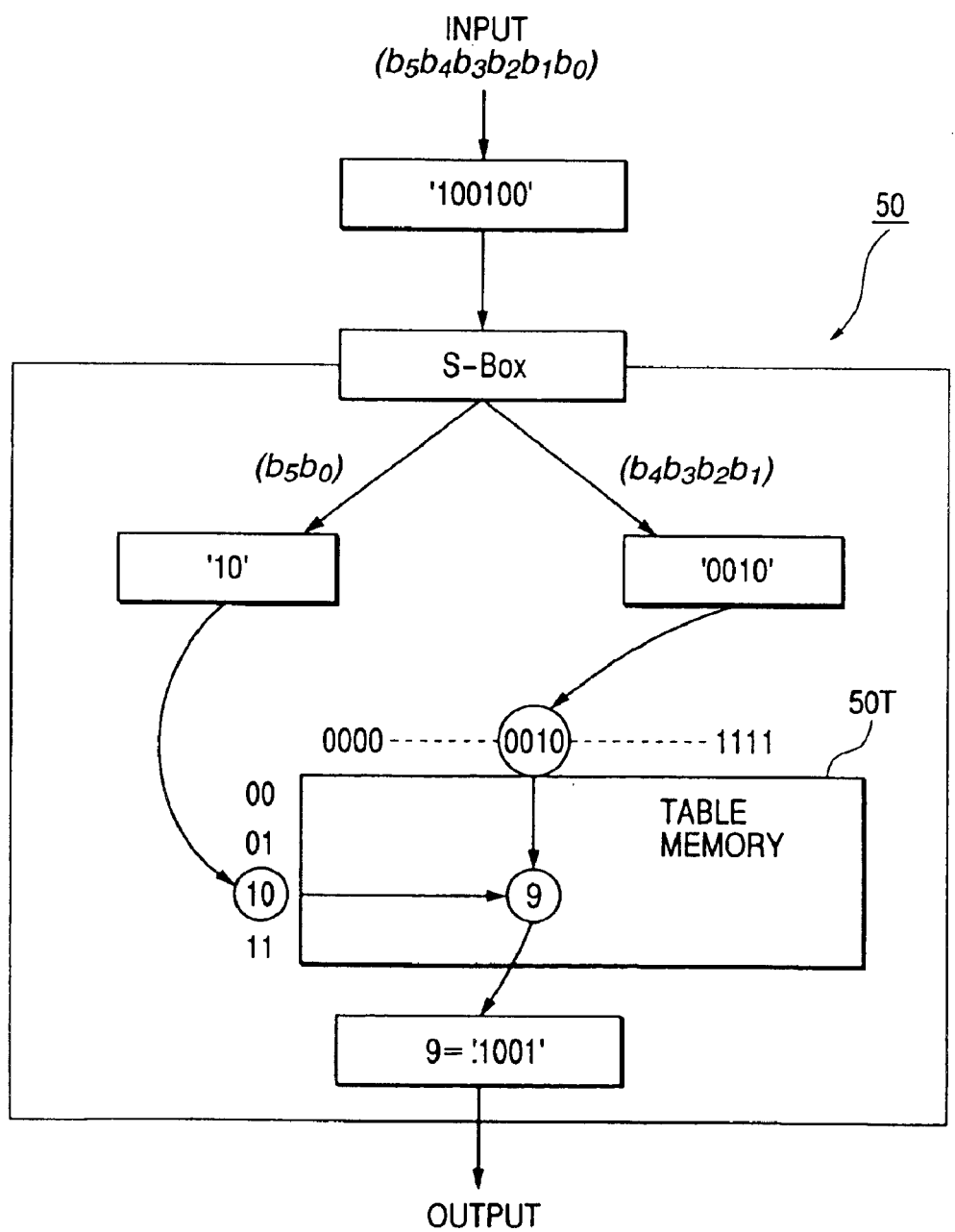
FIG. 1 is a diagram of a prior-art S-Box.

FIG. 1 shows an S-Box 50 in a prior-art DES system. The S-Box 50 outputs a 4-bit data piece in response to every 6-bit input data piece according to a one-way hash function "F(x)". Thus, the S-Box 50 implements data compression. The 6 bits in every input data piece are denoted by $b_5$, $b_4$, $b_3$, $b_2$, $b_1$, and $b_0$, respectively.

The one-way hash function is designed to meet the following conditions. It is easy to calculate the value "F(x)" from the value "x". It is difficult to calculate the value "x" from the value "F(x)".

The S-Box 50 includes a memory 50T storing data representing a two-dimensional table being a matrix of predetermined 4-bit data pieces. Specifically, the matrix has 4 rows by 16 columns. Four different states of a 2-bit signal are assigned to the rows in the matrix, respectively. Sixteen different states of a 4-bit signal are assigned to the columns in the matrix, respectively.

The S-Box 50 separates the 6 bits of every input data piece into first and second groups. The first group has bits $b_5$ and $b_0$. The second group has bits $b_4$, $b_3$, $b_2$, and $b_1$. The first group (bits $b_5$ and $b_0$) is used as a 2-bit signal for designating one from among the rows in the matrix. The second group (bits $b_4$, $b_3$, $b_2$, and $b_1$) is used as a 4-bit signal for designating one from among the columns in the matrix. A 4-bit predetermined data piece is read out from an element position in the matrix which coincides with the intersection of the designated row and column. The S-Box 50 outputs the read-out 4-bit data piece.

For example, an input data piece being "100100" is separated into a 2-bit signal of "10" (bits $b_5$ and $b_0$) and a 4-bit signal of "0010" (bits $b_4$, $b_3$, $b_2$, and $b_1$). The 2-bit signal of "10" designates corresponding one of the rows in the matrix. The 4-bit signal of "0010" designates corresponding one of the columns in the matrix. A predetermined 4-bit data piece being "1001" resides in an element position in the matrix which coincides with the intersection of the designated row and column. Thus, the 4-bit data piece "1001" is read out from the matrix before being outputted from the S-Box 50.

The S-Box 50 in the prior-art DES system is able to implement only 6-to-4 bit data reduction (compression). Accordingly, the S-Box 50 lacks flexibility regarding a data compression rate.

First Embodiment

Figure 2:
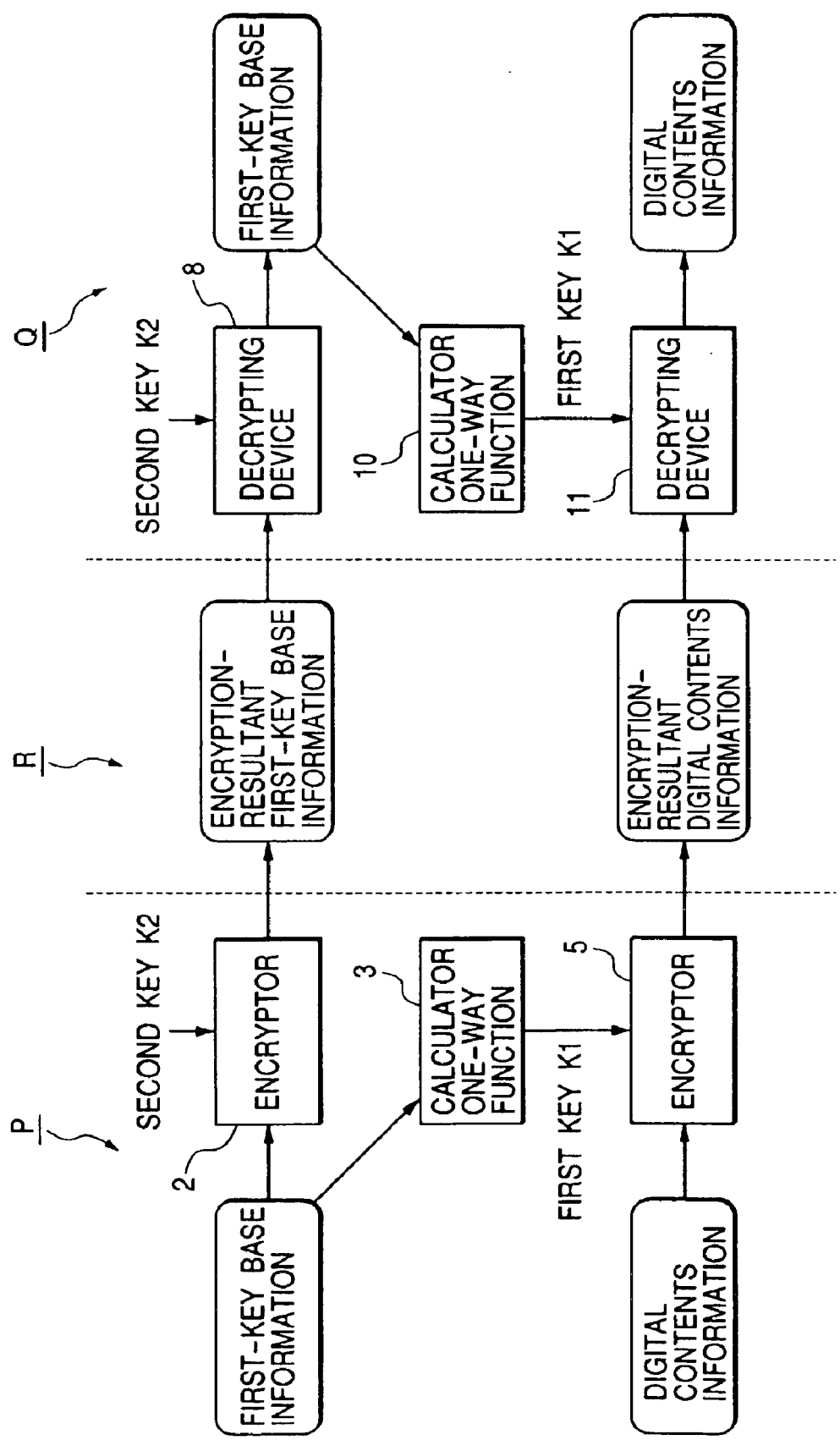
FIG. 2 is a block diagram of a system for contents information according to a first embodiment of this invention.

FIG. 2 shows a system for contents information according to a first embodiment of this invention. The system of FIG. 2 includes a primary section P, a secondary section Q, and an intermediate section R. The primary section P and the secondary section Q are connected to each other via the intermediate section R.

The primary section P includes an information recording apparatus or an information transmitting apparatus. The secondary section Q includes an information reproducing apparatus or an information receiving apparatus. An example of the information reproducing apparatus is an information player. The intermediate section R includes a recording medium or a transmission medium. Examples of the recording medium are a magnetic tape, a magnetic disc, an optical disc, and a memory card. Examples of the transmission medium are a communication network, a radio transmission line, and an optical transmission line. The communication network is, for example, the Internet or a telephone network. The transmission medium is also referred to as a transmission line.

The primary section P includes an encryptor 2, a calculator or a key generator 3, and an encryptor 5. The calculator 3 receives information being a base of a first key K1. The first-key base information is fed from a suitable device (not shown). The calculator 3 generates a signal (data) representative of the first key K1 from the first-key base information according to a predetermined one-way hash function. The calculator 3 outputs the first-key signal (the first-key data) to the encryptor 5. Preferably, the number of bits composing the first-key signal is significantly smaller than that of bits composing the first-key base information.

The encryptor 5 receives digital contents information from a suitable device (not shown). The contents information includes a video signal, an audio signal, or an audio video signal representing copyrighted contents. The encryptor 5 encrypts the received contents information into encryption-resultant contents information in response to the first-key signal. The encryptor 5 outputs the encryption-resultant contents information to the intermediate section R.

Specifically, the primary section P records the encryption-resultant contents information on the recording medium of the intermediate section R, or transmits the encryption-resultant contents information to the transmission line of the intermediate section R.

A signal (data) representative of a second key K2 is available in the primary section P. The second-key signal is fed from a suitable device (not shown). The second key K2 is peculiar to the system. Thus, the second key K2 is also referred to as the system key K2. For example, the second key K2 is based on identification (ID) information of the system. The second key K2 differs from the first key K1. The second key K2 may be equal to the first key K1.

The encryptor 2 receives the first-key base information and also the second-key signal. The encryptor 2 encrypts the first-key base information into encryption-resultant first-key base information in response to the second-key signal. The encryptor 2 outputs the encryption-resultant first-key base information to the intermediate section R.

Specifically, the primary section P records the encryption-resultant first-key base information on the recording medium of the intermediate section R, or transmits the encryption-resultant first-key base information to the transmission line of the intermediate section R.

The encryption-resultant contents information and the encryption-resultant first-key base information are transmitted from the primary section P to the secondary section Q through the intermediate section R.

The secondary section Q includes a decrypting device 8, a calculator or a key generator 10, and a decrypting device 11. A signal (data) representative of a second key or a system key K2 is available in the secondary section Q. The second-key signal is fed from a suitable device (not shown). The second key K2 is peculiar to the system. For example, the second key K2 is based on identification (ID) information of the system. The second key K2 in the secondary section Q is equivalent to that in the primary section P.

The decrypting device 8 receives the second-key signal. In addition, the decrypting device 8 receives the encryption-resultant first-key base information from the intermediate section R. The decrypting device 8 decrypts the encryption-resultant first-key base information into the first-key base information in response to the second-key signal. The decrypting device 8 outputs the first-key base information to the calculator 10.

The calculator 10 generates a signal (data) representative of a first key K1 from the first-key base information according to a predetermined one-way hash function equal to that used by the calculator 3 in the primary section P. The calculator 10 outputs the first-key signal (the first-key data) to the decrypting device 11. The first key K1 generated by the calculator 10 is equivalent to that generated by the calculator 3 in the primary section P.

The decrypting device 11 receives the encryption-resultant contents information from the intermediate section R. The decrypting device 11 decrypts the encryption-resultant contents information into the original digital contents information in response to the first-key signal. Thus, the decrypting device 11 reproduces the original digital contents information. The decrypting device 11 outputs the reproduced digital contents information.

The second key (the system key) K2 in the primary section P and that in the secondary section Q may be based on a common key cryptosystem. In this case, both the primary section P and the secondary section Q use a common key as a system key K2. The second key (the system key) K2 in the primary section P and that in the secondary section Q may be based on a public-key cryptosystem or a key-delivery cryptosystem.

The calculator (the key generator) 3 in the primary section P and the calculator (the key generator) 10 in the secondary section Q are similar in design and operation. Therefore, only the calculator 3 will be explained in more detail.

Figure 3:
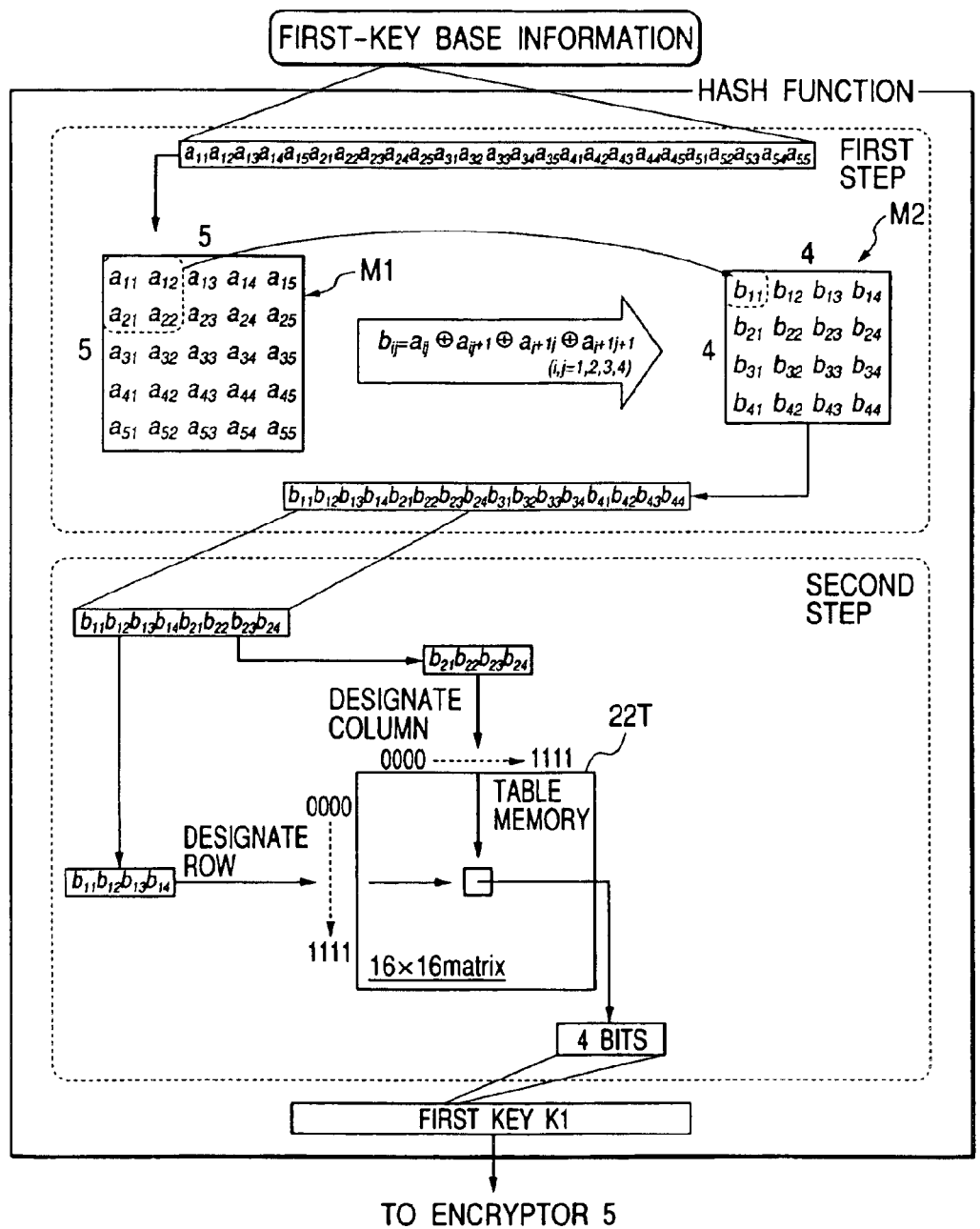
FIG. 3 is a flow diagram of operation of a calculator (a key generator) in FIG. 2.
Figure 4:
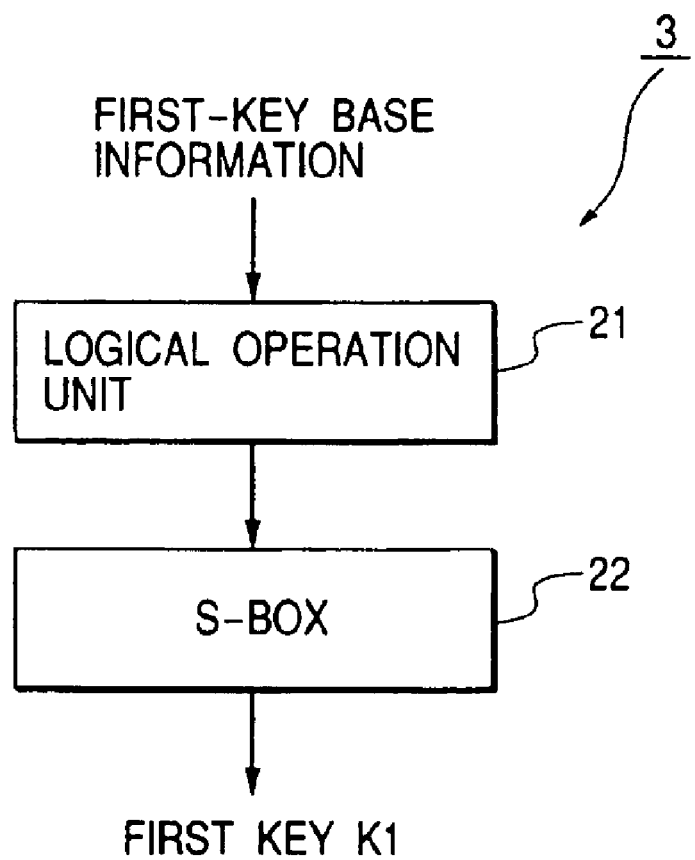
FIG. 4 is a block diagram of the calculator in FIG. 2.

FIG. 3 shows a flow of operation of the calculator 3. FIG. 4 shows a structure of the calculator 3. As shown in FIG. 3, the flow of operation of the calculator 3 is divided into first and second steps. The second step follows the first step. The operation of the calculator 3 accords with the predetermined one-way hash function. As shown in FIG. 4, the calculator 3 includes a logical operation unit 21 and an S-Box (a Selection-Box) 22 connected to each other. The S-Box 22 is designed in conformity with DES (Data Encryption Standard).

With reference to FIGS. 3 and 4, the calculator 3 receives the first-key base information. In the first step of FIG. 3, the logical operation unit 21 divides the first-key base information into blocks each having 25 successive bits. Each of the blocks forms a first bit sequence, that is, a sequence of bits $a_{11}$, $a_{12}$, $a_{13}$, $a_{14}$, $a_{15}$, $a_{21}$, $a_{22}$, $a_{23}$, $a_{24}$, $a_{25}$, $a_{31}$, $a_{32}$, $a_{33}$, $a_{34}$, $a_{35}$, $a_{41}$, $a_{42}$, $a_{43}$, $a_{44}$, $a_{45}$, $a_{51}$, $a_{52}$, $a_{53}$, $a_{54}$, and $a_{55}$. The first and second steps of FIG. 3 execute block-by-block signal processing.

In the first step of FIG. 3, the logical operation unit 21 rearranges the bits of each first bit sequence in a first matrix M1 according to a predetermined arrangement rule equal to that used in the calculator 10 of the secondary side Q. The first matrix M1 has 5 rows by 5 columns. Specifically, the first row in the first matrix M1 has bits $a_{11}$, $a_{12}$, $a_{13}$, $a_{14}$, and $a_{15}$. The second row has bits $a_{21}$, $a_{22}$, $a_{23}$, $a_{24}$, and $a_{25}$. The third row has bits $a_{31}$, $a_{32}$, $a_{33}$, $a_{34}$, and $a_{35}$. The fourth row has bits $a_{41}$, $a_{42}$, $a_{43}$, $a_{44}$, and $a_{45}$. The fifth row has bits $a_{51}$, $a_{52}$, $a_{53}$, $a_{54}$, and $a_{55}$. The first column in the first matrix M1 has bits $a_{11}$, $a_{21}$, $a_{31}$, $a_{41}$, and $a_{51}$. The second column has bits $a_{12}$, $a_{22}$, $a_{32}$, $a_{42}$, and $a_{52}$. The third column has bits $a_{13}$, $a_{23}$, $a_{33}$, $a_{43}$, and $a_{53}$. The fourth column has bits $a_{14}$, $a_{24}$, $a_{34}$, $a_{44}$, and $a_{54}$. The fifth column has bits $a_{15}$, $a_{25}$, $a_{35}$, $a_{45}$, and $a_{55}$.

In the first step of FIG. 3, the logical operation unit 21 sets a movable scanning window in the first matrix M1 which covers 2-by-2 neighboring elements (bits). Initially, the window is located in the uppermost and leftmost position within the first matrix M1, covering bits $a_{11}$, $a_{12}$, $a_{21}$, and $a_{22}$. The logical operation unit 21 executes Exclusive-OR operation among the bits $a_{11}$, $a_{12}$, $a_{21}$ and $a_{22}$. The result of the Exclusive-OR operation is a bit $b_{11}$. The logical operation unit 21 places the bit $b_{11}$ in the first-row first-column element position within a second matrix M2. As will be made clear later, the second matrix M2 has 4 rows by 4 columns. The window is shifted rightward from the initial position by one column. The resultant window covers bits $a_{12}$, $a_{13}$, $a_{22}$, and $a_{23}$. The logical operation unit 21 executes Exclusive-OR operation among the bits $a_{12}$, $a_{13}$, $a_{22}$, and $a_{23}$. The result of the Exclusive-OR operation is a bit $b_{12}$. The logical operation unit 21 places the bit $b_{12}$ in the first-row second-column element position within the second matrix M2. During a subsequent stage, signal processing similar to the above-mentioned signal processing is iterated. Specifically, the window is shifted rightward one column by one column, and Exclusive-OR operation is executed among four bits in the window each time the window is in one position. A bit being the result of each Exclusive-OR operation is placed in a corresponding element position within the second matrix M2. The window reaches the uppermost and rightmost position. When signal processing related to the window in the uppermost and rightmost position is completed, the first row in the second matrix M2 is filled with bits $b_{11}$, $b_{12}$, $b_{13}$, and $b_{14}$.

Then, the window is shifted to the second-uppermost and leftmost position within the first matrix M1, covering bits $a_{21}$, $a_{22}$, $a_{31}$, and $a_{32}$. The logical operation unit 21 executes Exclusive-OR operation among the bits $a_{21}$, $a_{22}$, $a_{31}$, and $a_{32}$. The result of the Exclusive-OR operation is a bit $b_{21}$. The logical operation unit 21 places the bit $b_{21}$ in the second-row first-column element position within the second matrix M2. The window is shifted rightward by one column. The resultant window covers bits $a_{22}$, $a_{23}$, $a_{32}$, and $a_{33}$. The logical operation unit 21 executes Exclusive-OR operation among the bits $a_{22}$, $a_{23}$, $a_{32}$, and $a_{33}$. The result of the Exclusive-OR operation is a bit $b_{22}$. The logical operation unit 21 places the bit $b_{22}$ in the second-row second-column element position within the second matrix M2. During a subsequent stage, signal processing similar to the above-mentioned signal processing is iterated. Specifically, the window is shifted rightward one column by one column, and Exclusive-OR operation is executed among four bits in the window each time the window is in one position. A bit being the result of each Exclusive-OR operation is placed in a corresponding element position within the second matrix M2. The window reaches the second-uppermost and rightmost position. When signal processing related to the window in the second-uppermost and rightmost position is completed, the second row in the second matrix M2 is filled with bits $b_{21}$, $b_{22}$, $b_{23}$, and $b_{24}$.

Then, the window is shifted to the third-uppermost and leftmost position within the first matrix M1. During a subsequent stage, signal processing similar to the above-mentioned signal processing is iterated. Specifically, the window is shifted rightward one column by one column, and Exclusive-OR operation is executed among four bits in the window each time the window is in one position. A bit being the result of each Exclusive-OR operation is placed in a corresponding element position within the second matrix M2. Finally, the window reaches the lowermost and rightmost position. When signal processing related to the window in the lowermost and rightmost position is completed, the second matrix M2 is filled with bits $b_{11}$, $b_{12}$, $b_{13}$, $b_{14}$, $b_{21}$, $b_{22}$, $b_{23}$, $b_{24}$, $b_{31}$, $b_{32}$, $b_{33}$, $b_{34}$, $b_{41}$, $b_{42}$, $b_{43}$, and $b_{44}$. In this way, the first step of FIG. 3 compresses the first matrix M1 into the second matrix M2. In other words, the first step compresses 25 bits (one block) into 16 bits. In the first step of FIG. 3, the logical operation unit 21 rearranges the bits of the second matrix M2 into a second bit sequence, that is, a sequence of bits $b_{11}$, $b_{12}$, $b_{13}$, $b_{14}$, $b_{21}$, $b_{22}$, $b_{23}$, $b_{24}$, $b_{31}$, $b_{32}$, $b_{33}$, $b_{34}$, $b_{41}$, $b_{42}$, $b_{43}$, and $b_{44}$.

Each Exclusive-OR operation among four bits $a_{ij}$, $a_{ij+1}$, $a_{i+1j}$, and $a_{i+1j+1}$ in the window is generally expressed as follows.

$$bij = a_{ij} \oplus a_{ij+1} \oplus a_{i+1j} \oplus a_{i+1j+1} \quad (1)$$

i, j=1, 2, 3, 4
where bij denotes a bit being the result of the Exclusive-OR operation, and $\oplus$ denotes an operator of one unit portion of the Exclusive-OR operation.

Setting the window in the first matrix M1 and shifting the window therein mean forming blocks in the first matrix M1, wherein each of the blocks has bits, the number of which is smaller than the number of bits composing the first matrix M1. Exclusive-OR operation among bits in the window means logical operation among bits in each of blocks in the first matrix M1.

It should be noted that the first step may divide the first-key base information into blocks each having more than or less than 25 successive bits. The first step may rearrange the bits of each first bit sequence (each 25-bit sequence) in the first matrix M1 according to a predetermined arrangement rule different from the previously-mentioned arrangement rule. The first step may execute OR operation or AND operation among four bits in the window instead of Exclusive-OR operation.

The second step of FIG. 3 relates to the S-Box 22. The S-Box 22 outputs a 4-bit data piece (a 4-bit sequence) in response to every 8-bit input data piece according to a one-way hash function. Thus, the S-Box 22 implements data compression. The S-Box 22 includes a memory 22T storing data representing a two-dimensional table being a matrix (an S-Box matrix) of predetermined 4-bit data pieces or predetermined 4-bit sequences. Specifically, the S-Box matrix has 16 rows by 16 columns. Sixteen different states of a 4-bit signal are assigned to the rows in the S-Box matrix, respectively. Sixteen different states of a 4-bit signal are assigned to the columns in the S-Box matrix, respectively.

In a former half of the second step of FIG. 3, the S-Box 22 selects 8 bits from the second bit sequence generated by the first step according to a predetermined selection rule equal to that used in the calculator 10 of the secondary side Q. Specifically, the S-Box 22 selects bits $b_{11}$, $b_{12}$, $b_{13}$, $b_{14}$, $b_{21}$, $b_{22}$, $b_{23}$, and $b_{24}$ from the second bit sequence. Then, the S-Box 22 separates the 8 selected bits into first and second groups. The first group has bits $b_{11}$, $b_{12}$, $b_{13}$, and $b_{14}$. The second group has bits $b_{21}$, $b_{22}$, $b_{23}$, and $b_{24}$. The first group (bits $b_{11}$, $b_{12}$, $b_{13}$, and $b_{14}$) is used as a 4-bit signal for designating one from among the rows in the S-Box matrix. The second group (bits $b_{21}$, $b_{22}$, $b_{23}$, and $b_{24}$) is used as a 4-bit signal for designating one from among the columns in the S-Box matrix. A predetermined 4-bit data piece (a predetermined 4-bit sequence) is read out from an element position in the S-Box matrix which coincides with the intersection of the designated row and column. The S-Box 22 outputs the read-out 4-bit data piece as a 4-bit portion of the first-key signal (the signal representative of the first key K1).

In a latter half of the second step of FIG. 3, the S-Box 22 selects 8 remaining bits, that is, bits $b_{31}$, $b_{32}$, $b_{33}$, $b_{34}$, $b_{41}$, $b_{42}$, $b_{43}$, and $b_{44}$ from the second bit sequence generated by the first step. Then, the S-Box 22 separates the 8 selected bits into first and second groups. The first group has bits $b_{31}$, $b_{32}$, $b_{33}$, and $b_{34}$. The second group has bits $b_{41}$, $b_{42}$, $b_{43}$, and $b_{44}$. The first group (bits $b_{31}$, $b_{32}$, $b_{33}$, and $b_{34}$) is used as a 4-bit signal for designating one from among the rows in the S-Box matrix. The second group (bits $b_{41}$, $b_{42}$, $b_{43}$, and $b_{44}$) is used as a 4-bit signal for designating one from among the columns in the S-Box matrix. A predetermined 4-bit data piece (a predetermined 4-bit sequence) is read out from an element position in the S-Box matrix which coincides with the intersection of the designated row and column. The S-Box 22 outputs the read-out 4-bit data piece as another 4-bit portion of the first-key signal (the signal representative of the first key K1). In this way, the second step of FIG. 3 compresses the second bit sequence (the 16-bit sequence) into an 8-bit portion of the first-key signal. Repetition of the previously-mentioned signal processing in the first and second steps of FIG. 3 completes the first-key signal.

It should be noted that the S-Box matrix for the bits $b_{31}$, $b_{32}$, $b_{33}$, $b_{34}$, $b_{41}$, $b_{42}$, $b_{43}$, and $b_{44}$ may differ from the S-Box matrix for the bits $b_{11}$, $b_{12}$, $b_{13}$, $b_{14}$, $b_{21}$, $b_{22}$, $b_{23}$, and $b_{24}$. Each of the data pieces at the respective element positions in the S-Box matrix may have a predetermined number of bits which differs from 4.

As understood from the previous description, the calculators or the key generators 3 and 10 implement 25-to-16 bit data reduction (compression) in the first step, and implement 16-to-8 bit data reduction (compression) in the second step. The S-Box 22 may fail to process bits $b_{31}$, $b_{32}$, $b_{33}$, $b_{34}$, $b_{41}$, $b_{42}$, $b_{43}$, and $b_{44}$ in the second bit sequence. In this case, the calculators 3 and 10 implement 16-to-4 bit data reduction (compression) in the second step. The calculators 3 and 10 may process and compress selected one or ones of 25-bit blocks of the first-key base information. In this case, the rate of the compression of the first-key base information to generate the first-key signal can be changed among different values. The first-key base information may have a given number of bits which differs from a multiple of 25. In this case, the calculators 3 and 10 divide the first-key base information into 25-bit blocks and one remaining block having bits, the number of which differs from 25. The calculators 3 and 10 discard the remaining block. Accordingly, the rate of the compression of the first-key base information to generate the first-key signal can be changed among various values. Thus, the calculators 3 and 10 are sufficiently flexible regarding a data compression rate.

The first embodiment of this invention may be modified as follows. Specifically, a modification of the first embodiment of this invention implements encryption through "n" stages, where "n" denotes a predetermined natural number equal to or greater than 3. In the modification, an n-th encryptor encrypts (n−1)-th key base information according to a predetermined one-way function.

Second Embodiment

Figure 5:
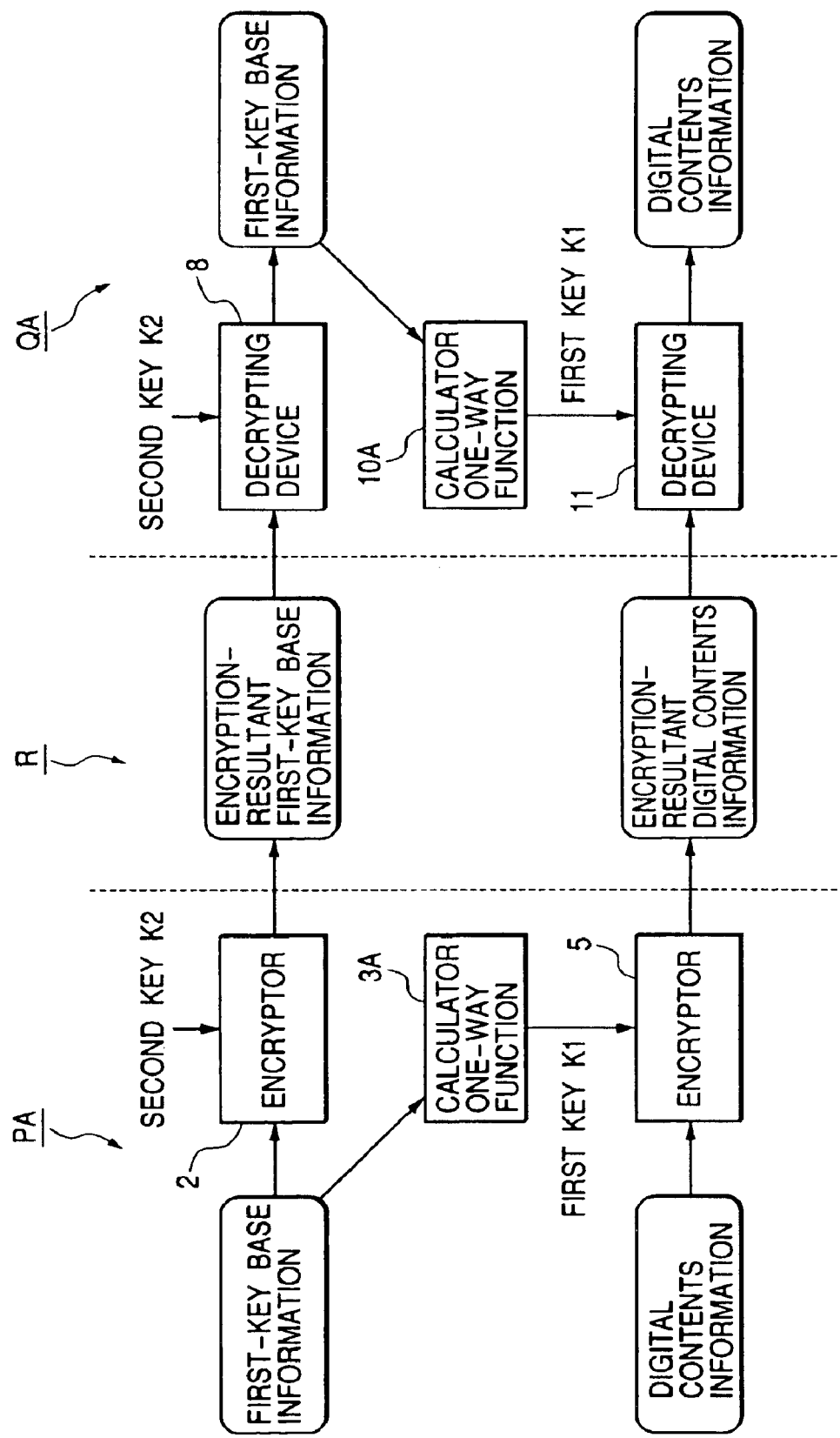
FIG. 5 is a block diagram of a system for contents information according to a second embodiment of this invention.

FIG. 5 shows a system for contents information according to a second embodiment of this invention. The system of FIG. 5 is similar to the system of FIG. 2 except for design changes mentioned later. The system of FIG. 5 includes a primary section PA and a secondary section QA instead of the primary section P and the secondary section Q (see FIG. 2), respectively.

The primary section PA is similar to the primary section P except that a signal generator (a key generator) 3A replaces the signal generator 3 in FIG. 2. The secondary section QA is similar to the secondary section Q except that a signal generator (a key generator) 10A replaces the signal generator 10 in FIG. 2.

The calculator (the key generator) 3A in the primary section PA and the calculator (the key generator) 10A in the secondary section QA are similar in design and operation. Therefore, only the calculator 3A will be explained in more detail.

Figure 6:
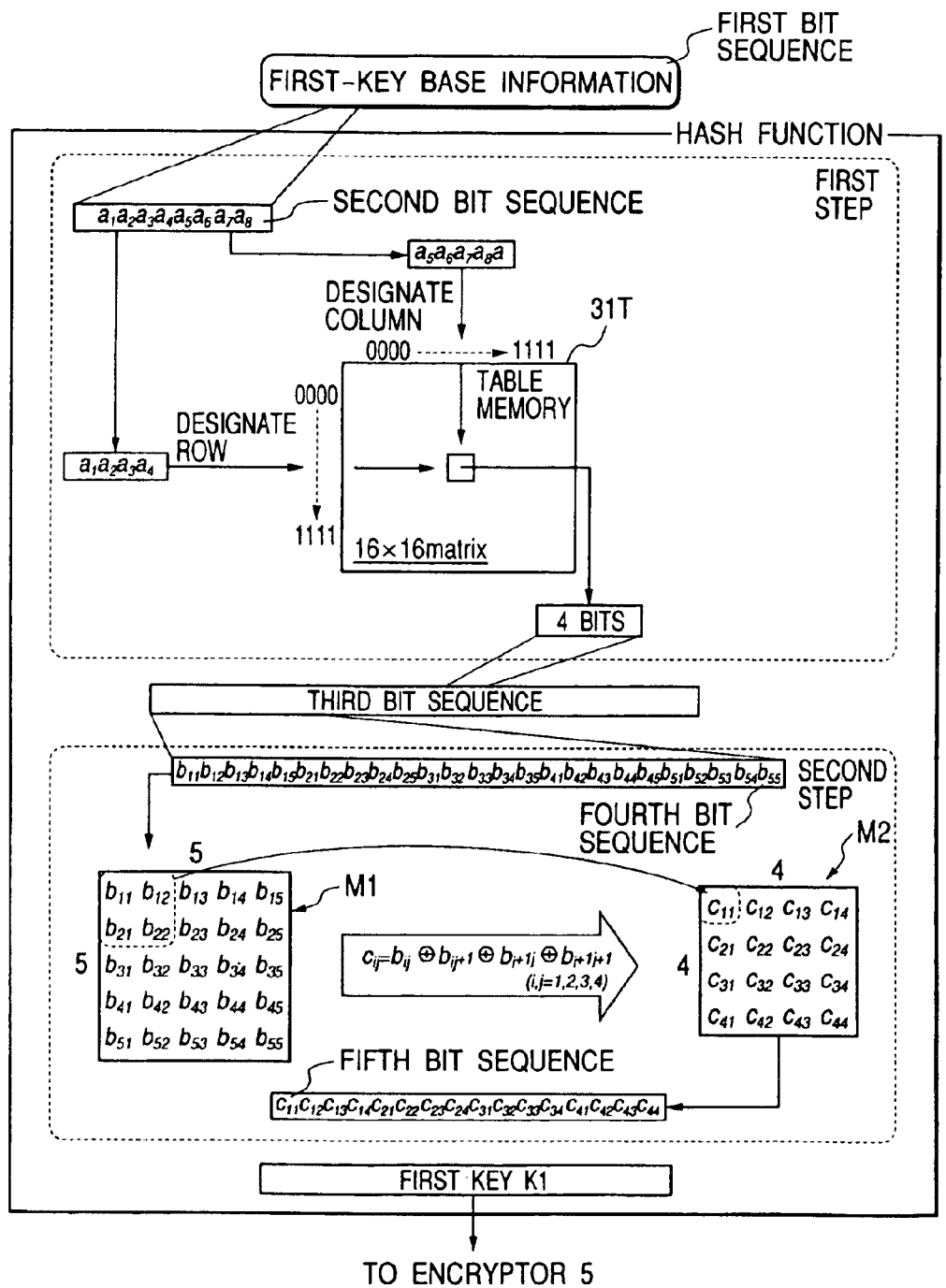
FIG. 6 is a flow diagram of operation of a calculator (a key generator) in FIG. 5.
Figure 7:
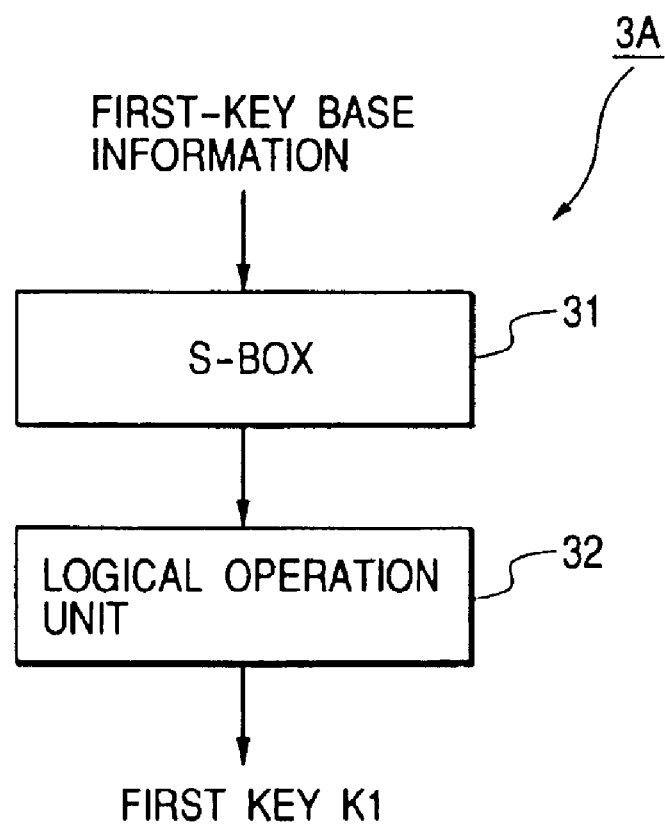
FIG. 7 is a block diagram of the calculator in FIG. 5.

FIG. 6 shows a flow of operation of the calculator 3A. FIG. 7 shows a structure of the calculator 3A. As shown in FIG. 6, the flow of operation of the calculator 3A is divided into first and second steps. The second step follows the first step. The operation of the calculator 3A accords with a predetermined one-way hash function. As shown in FIG. 7, the calculator 3A includes an S-Box (a Selection-Box) 31 and a logical operation unit 32 connected to each other. The S-Box 31 is designed in conformity with DES.

With reference to FIGS. 6 and 7, the calculator 3A receives first-key base information forming a first bit sequence, for example, a 200-bit sequence. The first and second steps of FIG. 6 compressively changes the first-key base information into a first-key signal (a signal representative of a first key). Preferably, the number of bits composing the first-key signal is significantly smaller than that of bits composing the first-key base information.

The first step of FIG. 6 relates to the S-Box 31. The S-Box 31 outputs a 4-bit data piece (a 4-bit sequence) in response to every 8-bit input data piece according to a one-way hash function. Thus, the S-Box 31 implements data compression. The S-Box 31 includes a memory 31T storing data representing a two-dimensional table being a matrix (an S-Box matrix) of predetermined 4-bit data pieces or predetermined 4-bit sequences. Specifically, the S-Box matrix has 16 rows by 16 columns. Sixteen different states of a 4-bit signal are assigned to the rows in the S-Box matrix, respectively. Sixteen different states of a 4-bit signal are assigned to the columns in the S-Box matrix, respectively.

In the first step of FIG. 6, the S-Box 31 divides the first-key base information into 25 blocks each having 8 successive bits. Each of the 8-bit blocks forms a second bit sequence, that is, a sequence of bits $a_1$, $a_2$, $a_3$, $a_4$, $a_5$, $a_6$, $a_7$, and $a_8$. The first step executes block-by-block signal processing.

In the first step of FIG. 6, the S-Box 31 separates the 8 bits of first one of the blocks into first and second groups. The first group has bits $a_1$, $a_2$, $a_3$, and $a_4$. The second group has bits $a_5$, $a_6$, $a_7$, and $a_8$. The first group (bits $a_1$, $a_2$, $a_3$, and $a_4$) is used as a 4-bit signal for designating one from among the rows in the S-Box matrix. The second group (bits $a_5$, $a_6$, $a_7$, and $a_8$) is used as a 4-bit signal for designating one from among the columns in the S-Box matrix. A predetermined 4-bit data piece (a predetermined 4-bit sequence) is read out from an element position in the S-Box matrix which coincides with the intersection of the designated row and column. The S-Box 31 outputs the read-out 4-bit data piece as a 4-bit portion of a third bit sequence (a 100-bit sequence) which corresponds to the first one of the 8-bit blocks.

For each of second and later ones of the 8-bit blocks, the S-Box 31 executes signal processing similar to the above-mentioned signal processing. As a result, the S-Box 31 compresses the 25 8-bit blocks into the respective 4-bit portions of the third bit sequence (the 100-bit sequence). In other words, the S-Box 31 compresses the first bit sequence (the 200-bit sequence) into the third bit sequence (the 100-bit sequence).

It should be noted that the first bit sequence formed by the first-key base information may have a predetermined number of bits which differs from 200. Also, the second bit sequence may have a predetermined number of bits which differs from 8. Furthermore, each of the data pieces at the respective element positions in the S-Box matrix may have a predetermined number of bits which differs from 4. In addition, the contents of the 4-bit data pieces at the respective element positions in the S-Box matrix may vary from 8-bit block to 8-bit block. In this case, different S-Box matrixes are provided for the 25 8-bit blocks, respectively. Only selected one or ones of the 4-bit data pieces read out from the S-Box matrix may be used to form the third bit sequence. In this case, the number of bits composing the third bit sequence differs from 100.

In the second step of FIG. 6, the logical operation unit 32 divides the third bit sequence (the 100-bit sequence) generated by the first step into blocks each having 25 successive bits. Each of the 25-bit blocks forms a fourth bit sequence, that is, a sequence of bits $b_{11}$, $b_{12}$, $b_{13}$, $b_{14}$, $b_{15}$, $b_{21}$, $b_{22}$, $b_{23}$, $b_{24}$, $b_{25}$, $b_{31}$, $b_{32}$, $b_{33}$, $b_{34}$, $b_{35}$, $b_{41}$, $b_{42}$, $b_{43}$, $b_{44}$, $b_{45}$, $b_{51}$, $b_{52}$, $b_{53}$, $b_{54}$, and $b_{55}$. The second step of FIG. 6 executes signal processing on a 25-bit-block by 25-bit-block basis.

When the number of bits composing the third bit sequence is equal to 25, the third bit sequence is directly used as the fourth bit sequence.

In the second step of FIG. 6, the logical operation unit 32 uses a first matrix M1 and a second matrix M2. Specifically, the logical operation unit 32 rearranges the bits of each fourth bit sequence in the first matrix M1 according to a predetermined arrangement rule equal to that used in the calculator 10A of the secondary side QA. The first matrix M1 has 5 rows by 5 columns. Specifically, the first row in the first matrix M1 has bits $b_{11}$, $b_{12}$, $b_{13}$, $b_{14}$, and $b_{15}$. The second row has bits $b_{21}$, $b_{22}$, $b_{23}$, $b_{24}$, and $b_{25}$. The third row has bits $b_{31}$, $b_{32}$, $b_{33}$, $b_{34}$, and $b_{35}$. The fourth row has bits $b_{41}$, $b_{42}$, $b_{43}$, $b_{44}$, and $b_{45}$. The fifth row has bits $b_{51}$, $b_{52}$, $b_{53}$, $b_{54}$, and $b_{55}$. The first column in the first matrix M1 has bits $b_{11}$, $b_{21}$, $b_{31}$, $b_{41}$, and $b_{51}$. The second column has bits $b_{12}$, $b_{22}$, $b_{32}$, $b_{42}$, and $b_{52}$. The third column has bits $b_{13}$, $b_{23}$, $b_{33}$, $b_{43}$, and $b_{53}$. The fourth column has bits $b_{14}$, $b_{24}$, $b_{34}$, $b_{44}$, and $b_{54}$. The fifth column has bits $b_{15}$, $b_{25}$, $b_{35}$, $b_{45}$, and $b_{55}$.

In the second step of FIG. 6, the logical operation unit 32 sets a movable scanning window in the first matrix M1 which covers 2-by-2 neighboring elements (bits). Initially, the window is located in the uppermost and leftmost position within the first matrix M1, covering bits $b_{11}$, $b_{12}$, $b_{21}$, and $b_{22}$. The logical operation unit 32 executes Exclusive-OR operation among the bits $b_{11}$, $b_{12}$, $b_{21}$, and $b_{22}$. The result of the Exclusive-OR operation is a bit $c_{11}$. The logical operation unit 32 places the bit $c_{11}$ in the first-row first-column element position within the second matrix M2. As will be made clear later, the second matrix M2 has 4 rows by 4 columns. The window is shifted rightward from the initial position by one column. The resultant window covers bits $b_{12}$, $b_{13}$, $b_{22}$, and $b_{23}$. The logical operation unit 32 executes Exclusive-OR operation among the bits $b_{12}$, $b_{13}$, $b_{22}$, and $b_{23}$. The result of the Exclusive-OR operation is a bit $C_{12}$. The logical operation unit 32 places the bit $c_{12}$ in the first-row second-column element position within the second matrix M2. During a subsequent stage, signal processing similar to the above-mentioned signal processing is iterated. Specifically, the window is shifted rightward one column by one column, and Exclusive-OR operation is executed among four bits in the window each time the window is in one position. A bit being the result of each Exclusive-OR operation is placed in a corresponding element position within the second matrix M2. The window reaches the uppermost and rightmost position. When signal processing related to the window in the uppermost and rightmost position is completed, the first row in the second matrix M2 is filled with bits $c_{11}$, $c_{12}$, $c_{13}$, and $c_{14}$.

Then, the window is shifted to the second-uppermost and leftmost position within the first matrix M1, covering bits $b_{21}$, $b_{22}$, $b_{31}$, and $b_{32}$. The logical operation unit 32 executes Exclusive-OR operation among the bits $b_{21}$, $b_{22}$, $b_{31}$, and $b_{32}$. The result of the Exclusive-OR operation is a bit $c_{21}$. The logical operation unit 32 places the bit $c_{21}$ in the second-row first-column element position within the second matrix M2. The window is shifted rightward by one column. The resultant window covers bits $b_{22}$, $b_{23}$, $b_{32}$, and $b_{33}$. The logical operation unit 32 executes Exclusive-OR operation among the bits $b_{22}$, $b_{23}$, $b_{32}$, and $b_{33}$. The result of the Exclusive-OR operation is a bit $c_{22}$. The logical operation unit 32 places the bit $c_{22}$ in the second-row second-column element position within the second matrix M2. During a subsequent stage, signal processing similar to the above-mentioned signal processing is iterated. Specifically, the window is shifted rightward one column by one column, and Exclusive-OR operation is executed among four bits in the window each time the window is in one position. A bit being the result of each Exclusive-OR operation is placed in a corresponding element position within the second matrix M2. The window reaches the second-uppermost and rightmost position. When signal processing related to the window in the second-uppermost and rightmost position is completed, the second row in the second matrix M2 is filled with bits $c_{21}$, $c_{22}$, $c_{23}$, and $c_{24}$.

Then, the window is shifted to the third-uppermost and leftmost position within the first matrix M1. During a subsequent stage, signal processing similar to the above-mentioned signal processing is iterated. Specifically, the window is shifted rightward one column by one column, and Exclusive-OR operation is executed among four bits in the window each time the window is in one position. A bit being the result of each Exclusive-OR operation is placed in a corresponding element position within the second matrix M2. Finally, the window reaches the lowermost and rightmost position. When processes related to the window in the lowermost and rightmost position are completed, the second matrix M2 is filled with bits $c_{11}$, $c_{12}$, $c_{13}$, $c_{14}$, $c_{21}$, $c_{22}$, $c_{23}$, $c_{24}$, $c_{31}$, $c_{32}$, $c_{33}$, $c_{34}$, $c_{41}$, $c_{42}$, $c_{43}$, and $c_{44}$. In this way, the second step of FIG. 6 compresses the first matrix M1 into the second matrix M2. In other words, the first step compresses 25 bits (one block) into 16 bits. In the second step of FIG. 6, the logical operation unit 32 rearranges the bits of the second matrix M2 into a fifth bit sequence, that is, a sequence of bits $c_{11}$, $c_{12}$, $c_{13}$, $c_{14}$, $c_{21}$, $c_{22}$, $c_{23}$, $c_{24}$, $c_{31}$, $c_{32}$, $c_{33}$, $c_{34}$, $c_{41}$, $c_{42}$, $c_{43}$, and $c_{44}$. The logical operation unit 32 outputs the fifth bit sequence as a 16-bit portion of a first-key signal (a signal representative of a first key K1). In this way, the second step of FIG. 6 compresses the fourth bit sequence (the 25-bit sequence) into a 16-bit portion of the first-key signal.

The second step of FIG. 6 executes the previously-mentioned signal processing for each of the 25-bit blocks (the fourth bit sequences). In other words, the second step repeats the signal processing a predetermined number of times which is equal to the number of the 25-bit blocks (the fourth bit sequences). The repetition of the signal processing completes the first-key signal. In the case where the number of the 25-bit blocks (the fourth bit sequences) is equal to 4, the first-key signal is formed by 64 bits.

It should be noted that the logical operation unit 32 may output only one fifth bit sequence as the whole of the first-key signal.

Each Exclusive-OR operation among four bits $b_{ij}$, $b_{ij+1}$, $b_{i+1j}$, and $b_{i+1j+1}$ in the window is generally expressed as follows.

$$cij = b_{ij} \oplus b_{ij+1} \oplus b_{i+1j} \oplus b_{i+1j+1} \quad (2)$$

i, j=1, 2, 3, 4
where cij denotes a bit being the result of the Exclusive-OR operation, and $\oplus$ denotes an operator of one unit portion of the Exclusive-OR operation.

Setting the window in the first matrix M1 and shifting the window therein mean forming blocks in the first matrix M1, wherein each of the blocks has bits, the number of which is smaller than the number of bits composing the first matrix M1. Exclusive-OR operation among bits in the window means logical operation among bits in each of blocks in the first matrix M1.

It should be noted that the second step of FIG. 6 may divide the third bit sequence generated by the first step into blocks each having successive bits, the number of which differs from 25. In this case, the number of bits composing one fourth bit sequence differs from 25. Also, the second step may rearrange the bits of each fourth bit sequence (each 25-bit sequence) in the first matrix M1 according to a predetermined arrangement rule different from the previously-mentioned arrangement rule. The second step may execute OR operation or AND operation among four bits in the window instead of Exclusive-OR operation.

As understood from the previous description, the calculators or the key generators 3A and 10A implement 8-to-4 bit data reduction (compression) in the first step, and implement 25-to-16 bit data reduction (compression) in the second step. The calculators 3A and 10A may process and compress selected one or ones of 8-bit blocks of the first-key base information. In this case, the rate of the compression of the first-key base information to generate the first-key signal can be changed among different values. The first-key base information may have a given number of bits which differs from a multiple of 8. In this case, the calculators 3A and 10A divide the first-key base information into 8-bit blocks and one remaining block having bits, the number of which differs from 8. The calculators 3A and 10A discard the remaining block. Accordingly, the rate of the compression of the first-key base information to generate the first-key signal can be changed among various values. Thus, the calculators 3A and 10A are sufficiently flexible regarding a data compression rate.

The second embodiment of this invention may be modified as follows. Specifically, a modification of the second embodiment of this invention implements encryption through "n" stages, where "n" denotes a predetermined natural number equal to or greater than 3. In the modification, an n-th encryptor encrypts (n−1)-th key base information according to a predetermined one-way function.

What is claimed is:

1. A method of generating key information, comprising the steps of:

rearranging bits of a first bit sequence in a first matrix according to a predetermined arrangement rule, the first bit sequence representing information being a base of a key;

forming blocks in the first matrix, wherein each of the blocks has bits, the number of which is smaller than the number of bits composing the first matrix;

executing logical operation among bits in each of the blocks and generating a bit being a result of the logical operation;

combining the logical-operation-result bits into a second bit sequence, wherein the number of bits composing the second bit sequence is smaller than the number of bits composing the first bit sequence; and accessing a second matrix composed of predetermined third bit sequences and reading out one from among the third bit sequences in response to the second bit sequence, and outputting the read-out third bit sequence as information representative of the key, wherein the number of bits composing each of the third bit sequences is smaller than the number of bits composing the second bit sequence.

2. An apparatus for generating key information, comprising:

means for rearranging bits of a first bit sequence in a first matrix according to a predetermined arrangement rule, the first bit sequence representing information being a base of a key;

means for forming blocks in the first matrix, wherein each of the blocks has bits, the number of which is smaller than the number of bits composing the first matrix;

means for executing logical operation among bits in each of the blocks and generating a bit being a result of the logical operation;

means for combining the logical-operation-result bits into a second bit sequence, wherein the number of bits composing the second bit sequence is smaller than the number of bits composing the first bit sequence; and means for accessing a second matrix composed of predetermined third bit sequences and reading out one from among the third bit sequences in response to the second bit sequence, and outputting the read-out third bit sequence as information representative of the key, wherein the number of bits composing each of the third bit sequences is smaller than the number of bits composing the second bit sequence.

3. A method of encrypting contents information, comprising the steps of:

generating a signal representative of a key from information being a base of the key, the key base information including a first bit sequence; and encrypting contents information in response to the key signal;

wherein the generating step comprises:

1) rearranging bits of the first bit sequence in a first matrix according to a predetermined arrangement rule;

2) forming blocks in the first matrix, wherein each of the blocks has bits, the number of which is smaller than the number of bits composing the first matrix;

3) executing logical operation among bits in each of the blocks and generating a bit being a result of the logical operation;

4) combining the logical-operation-result bits into a second bit sequence, wherein the number of bits composing the second bit sequence is smaller than the number of bits composing the first bit sequence; and 5) accessing a second matrix composed of predetermined third bit sequences and reading out one from among the third bit sequences in response to the second bit sequence, and outputting the read-out third bit sequence as the key signal, wherein the number of bits composing each of the third bit sequences is smaller than the number of bits composing the second bit sequence.

4. An apparatus for encrypting contents information, comprising:

means for generating a signal representative of a key from information being a base of the key, the key base information including a first bit sequence; and means for encrypting contents information in response to the key signal;

wherein the generating means comprises:

1) means for rearranging bits of the first bit sequence in a first matrix according to a predetermined arrangement rule;

2) means for forming blocks in the first matrix, wherein each of the blocks has bits, the number of which is smaller than the number of bits composing the first matrix;

3) means for executing logical operation among bits in each of the blocks and generating a bit being a result of the logical operation;

4) means for combining the logical-operation-result bits into a second bit sequence, wherein the number of bits composing the second bit sequence is smaller than the number of bits composing the first bit sequence; and 5) means for accessing a second matrix composed of predetermined third bit sequences and reading out one from among the third bit sequences in response to the second bit sequence, and outputting the read-out third bit sequence as the key signal, wherein the number of bits composing each of the third bit sequences is smaller than the number of bits composing the second bit sequence.

5. A method of decrypting contents information, comprising the steps of:

generating a signal representative of a key from information being a base of the key, the key base information including a first bit sequence; and decrypting encryption-resultant contents information in response to the key signal;

wherein the generating step comprises:

1) rearranging bits of the first bit sequence in a first matrix according to a predetermined arrangement rule;

2) forming blocks in the first matrix, wherein each of the blocks has bits, the number of which is smaller than the number of bits composing the first matrix;

3) executing logical operation among bits in each of the blocks and generating a bit being a result of the logical operation;

4) combining the logical-operation-result bits into a second bit sequence, wherein the number of bits composing the second bit sequence is smaller than the number of bits composing the first bit sequence; and 5) accessing a second matrix composed of predetermined third bit sequences and reading out one from among the third bit sequences in response to the second bit sequence, and outputting the read-out third bit sequence as the key signal, wherein the number of bits composing each of the third bit sequences is smaller than the number of bits composing the second bit sequence.

6. An apparatus for decrypting contents information, comprising:

means for generating a signal representative of a key from information being a base of the key, the key base information including a first bit sequence; and means for decrypting encryption-resultant contents information in response to the key signal;

wherein the generating means comprises:
1) means for rearranging bits of the first bit sequence in a first matrix according to a predetermined arrangement rule;
2) means for forming blocks in the first matrix, wherein each of the blocks has bits, the number of which is smaller than the number of bits composing the first matrix;
3) means for executing logical operation among bits in each of the blocks and generating a bit being a result of the logical operation;
4) means for combining the logical-operation-result bits into a second bit sequence, wherein the number of bits composing the second bit sequence is smaller than the number of bits composing the first bit sequence; and
5) means for accessing a second matrix composed of predetermined third bit sequences and reading out one from among the third bit sequences in response to the second bit sequence, and outputting the read-out third bit sequence as the key signal, wherein the number of bits composing each of the third bit sequences is smaller than the number of bits composing the second bit sequence.

7. A recording medium storing encryption-resultant key base information and encryption-resultant contents information generated by the method in claim 3.

8. A method of transmitting contents information, comprising the steps of transmitting encryption-resultant key base information through a transmission line, and transmitting encryption-resultant contents information through the transmission line, the encryption-resultant contents information being generated by the method in claim 3.

9. A method of generating key information, comprising the steps of:
dividing a first bit sequence into second bit sequences, the first bit sequence being contained in information being a base of a key, wherein the number of bits composing each of the second bit sequences is smaller than the number of bits composing the first bit sequence;
sequentially accessing a first matrix composed of predetermined data pieces and sequentially reading out ones from among the predetermined data pieces in response to the second bit sequences;
combining the read-out data pieces into a third bit sequence, wherein the number of bits composing the third bit sequence is smaller than the number of bits composing the first bit sequence;
rearranging bits of at least part of the third bit sequence in a second matrix according to a predetermined arrangement rule;
forming blocks in the second matrix, wherein each of the blocks has bits, the number of which is smaller than the number of bits composing the second matrix;
executing logical operation among bits in each of the blocks and generating a bit being a result of the logical operation; and
combining the logical-operation-result bits into a fourth bit sequence, and outputting the fourth bit sequence as at least part of information representative of the key, wherein the number of bits composing the fourth bit sequence is smaller than the number of bits composing the second matrix.

10. An apparatus for generating key information, comprising:
means for dividing a first bit sequence into second bit sequences, the first bit sequence being contained in information being a base of a key, wherein the number of bits composing each of the second bit sequences is smaller than the number of bits composing the first bit sequence;
means for sequentially accessing a first matrix composed of predetermined data pieces and sequentially reading out ones from among the predetermined data pieces in response to the second bit sequences;
means for combining the read-out data pieces into a third bit sequence, wherein the number of bits composing the third bit sequence is smaller than the number of bits composing the first bit sequence;
means for rearranging bits of at least part of the third bit sequence in a second matrix according to a predetermined arrangement rule;
means for forming blocks in the second matrix, wherein each of the blocks has bits, the number of which is smaller than the number of bits composing the second matrix;
means for executing logical operation among bits in each of the blocks and generating a bit being a result of the logical operation; and
means for combining the logical-operation-result bits into a fourth bit sequence, and outputting the fourth bit sequence as at least part of information representative of the key, wherein the number of bits composing the fourth bit sequence is smaller than the number of bits composing the second matrix.

11. A method of encrypting contents information, comprising the steps of:
generating a signal representative of a key from information being a base of the key, the key base information including a first bit sequence; and
encrypting contents information in response to the key signal;
wherein the generating step comprises:
1) dividing the first bit sequence into second bit sequences, wherein the number of bits composing each of the second bit sequences is smaller than the number of bits composing the first bit sequence;
2) sequentially accessing a first matrix composed of predetermined data pieces and sequentially reading out ones from among the predetermined data pieces in response to the second bit sequences;
3) combining the read-out data pieces into a third bit sequence, wherein the number of bits composing the third bit sequence is smaller than the number of bits composing the first bit sequence;
4) rearranging bits of at least part of the third bit sequence in a second matrix according to a predetermined arrangement rule;
5) forming blocks in the second matrix, wherein each of the blocks has bits, the number of which is smaller than the number of bits composing the second matrix;
6) executing logical operation among bits in each of the blocks and generating a bit being a result of the logical operation; and
7) combining the logical-operation-result bits into a fourth bit sequence, and outputting the fourth bit sequence as at least part of the key signal.

12. An apparatus for encrypting contents information, comprising:
means for generating a signal representative of a key from information being a base of the key, the key base information including a first bit sequence; and means for encrypting contents information in response to the key signal;

wherein the generating means comprises:

1) means for dividing the first bit sequence into second bit sequences, wherein the number of bits composing each of the second bit sequences is smaller than the number of bits composing the first bit sequence;

2) means for sequentially accessing a first matrix composed of predetermined data pieces and sequentially reading out ones from among the predetermined data pieces in response to the second bit sequences;

3) means for combining the read-out data pieces into a third bit sequence, wherein the number of bits composing the third bit sequence is smaller than the number of bits composing the first bit sequence;

4) means for rearranging bits of at least part of the third bit sequence in a second matrix according to a predetermined arrangement rule;

5) means for forming blocks in the second matrix, wherein each of the blocks has bits, the number of which is smaller than the number of bits composing the second matrix;

6) means for executing logical operation among bits in each of the blocks and generating a bit being a result of the logical operation; and 7) means for combining the logical-operation-result bits into a fourth bit sequence, and outputting the fourth bit sequence as at least part of the key signal.

13. A method of decrypting contents information, comprising the steps of:

generating a signal representative of a key from information being a base of the key, the key base information including a first bit sequence; and decrypting encryption-resultant contents information in response to the key signal;

wherein the generating step comprises:

1) dividing the first bit sequence into second bit sequences, wherein the number of bits composing each of the second bit sequences is smaller than the number of bits composing the first bit sequence;

2) sequentially accessing a first matrix composed of predetermined data pieces and sequentially reading out ones from among the predetermined data pieces in response to the second bit sequences;

3) combining the read-out data pieces into a third bit sequence, wherein the number of bits composing the third bit sequence is smaller than the number of bits composing the first bit sequence;

4) rearranging bits of at least part of the third bit sequence in a second matrix according to a predetermined arrangement rule;

5) forming blocks in the second matrix, wherein each of the blocks has bits, the number of which is smaller than the number of bits composing the second matrix;

6) executing logical operation among bits in each of the blocks and generating a bit being a result of the logical operation; and 7) combining the logical-operation-result bits into a fourth bit sequence, and outputting the fourth bit sequence as at least part of the key signal.

14. An apparatus for decrypting contents information, comprising:

means for generating a signal representative of a key from information being a base of the key, the key base information including a first bit sequence; and means for decrypting encryption-resultant contents information in response to the key signal;

wherein the generating means comprises:

1) means for dividing the first bit sequence into second bit sequences, wherein the number of bits composing each of the second bit sequences is smaller than the number of bits composing the first bit sequence;

2) means for sequentially accessing a first matrix composed of predetermined data pieces and sequentially reading out ones from among the predetermined data pieces in response to the second bit sequences;

3) means for combining the read-out data pieces into a third bit sequence, wherein the number of bits composing the third bit sequence is smaller than the number of bits composing the first bit sequence;

4) means for rearranging bits of at least part of the third bit sequence in a second matrix according to a predetermined arrangement rule;

5) means for forming blocks in the second matrix, wherein each of the blocks has bits, the number of which is smaller than the number of bits composing the second matrix;

6) means for executing logical operation among bits in each of the blocks and generating a bit being a result of the logical operation; and 7) means for combining the logical-operation-result bits into a fourth bit sequence, and outputting the fourth bit sequence as at least part of the key signal.

15. A recording medium storing encryption-resultant key base information and encryption-resultant contents information generated by the method in claim 11.

16. A method of transmitting contents information, comprising the steps of transmitting encryption-resultant key base information through a transmission line, and transmitting encryption-resultant contents information through the transmission line, the encryption-resultant contents information being generated by the method in claim 11.

* * * * *